United States Patent
Bülow et al.

(10) Patent No.: US 6,416,569 B1
(45) Date of Patent: Jul. 9, 2002

(54) TEMPERATURE SWING ADSORPTION PROCESS

(75) Inventors: Martin Bülow, Basking Ridge; Adeola F. Ojo, Scotch Plains; Frank R. Fitch, Bedminster, all of NJ (US); Baldur Unger, Dessau; Alfons Brandt, Salzmünde, both of (DE)

(73) Assignees: The BOC Group, Inc., Murray Hill, NJ (US); Chemiewerk Bad Köstritz GmbH, Heinrichshall (DE)

( * ) Notice: Subject to any disclaimer, the term of this patent is extended or adjusted under 35 U.S.C. 154(b) by 50 days.

This patent is subject to a terminal disclaimer.

(21) Appl. No.: 09/648,802

(22) Filed: Aug. 28, 2000

(51) Int. Cl.⁷ .......................... B01D 53/04; B01D 53/26
(52) U.S. Cl. .................. 95/129; 95/126; 95/143; 96/132; 423/239.2
(58) Field of Search .................. 95/117, 121, 126, 95/128, 129, 143, 148, 902; 96/121, 130, 131, 132; 502/79, 431; 423/700, 239.2, 328.1

(56) References Cited

U.S. PATENT DOCUMENTS

| | | |
|---|---|---|
| 2,882,243 A | 4/1959 | Milton |
| 2,882,244 A | 4/1959 | Milton |
| 2,996,358 A | 8/1961 | Milton |
| 3,012,853 A | 12/1961 | Milton |
| 3,503,901 A | 3/1970 | Pickert |
| 3,576,901 A | 4/1971 | Kokotailo et al. |
| 3,723,308 A | 3/1973 | Breck |
| 3,732,326 A | 5/1973 | Chen |
| 3,773,690 A | 11/1973 | Heinze et al. |
| 3,885,927 A | 5/1975 | Sherman et al. |
| 3,985,859 A | 10/1976 | Blaine |
| 4,122,007 A | 10/1978 | Yamamoto et al. |
| 4,173,622 A | 11/1979 | Robertson |
| 4,235,856 A | 11/1980 | Kostinko |
| 4,303,629 A | 12/1981 | Strack et al. |
| 4,443,422 A | 4/1984 | Kostinko |
| 4,556,550 A | 12/1985 | Ross et al. |
| 4,603,040 A | 7/1986 | Kuznicki et al. |
| 4,606,899 A | 8/1986 | Butter et al. |
| 4,775,396 A | 10/1988 | Rastelli et al. |
| 4,913,850 A | 4/1990 | Puppe et al. |
| 5,075,084 A | 12/1991 | Wilhelm et al. |
| 5,152,813 A | 10/1992 | Coe et al. |
| 5,173,462 A | 12/1992 | Plee |
| 5,174,979 A | 12/1992 | Chao et al. |
| 5,354,360 A | 10/1994 | Coe et al. |
| 5,413,625 A | 5/1995 | Chao et al. |
| 5,464,467 A | 11/1995 | Fitch et al. |
| 5,531,808 A | 7/1996 | Ojo et al. |
| 5,562,756 A | 10/1996 | Coe et al. |
| 5,567,407 A | 10/1996 | Coe et al. |
| 5,656,064 A | 8/1997 | Golden et al. |
| 5,728,198 A * | 3/1998 | Acharya et al. ............ 95/114 |
| 5,779,766 A | 7/1998 | Weigel et al. |
| 5,779,767 A | 7/1998 | Golden et al. |
| 5,882,625 A | 3/1999 | Mac Dougall et al. |
| 5,908,823 A | 6/1999 | Zatta et al. |
| 5,916,836 A | 6/1999 | Toufar et al. |
| 5,962,358 A | 10/1999 | Hees et al. |
| 6,051,051 A | 4/2000 | Hees et al. |
| 6,106,593 A | 8/2000 | Golden et al. |
| 6,143,057 A | 11/2000 | Bülow et al. |
| 6,273,939 B1 * | 8/2001 | Millet et al. ............ 95/143 |

FOREIGN PATENT DOCUMENTS

| | | |
|---|---|---|
| DE | 43 221 | 11/1965 |
| DE | 2 016 838 | 4/1970 |
| DE | 17 67 906 | 2/1972 |
| EP | 0 196 103 A2 | 3/1986 |
| EP | 0 816 291 A1 | 1/1998 |
| EP | 0 995 477 A1 | 4/2000 |
| GB | 1 051 621 | 12/1966 |
| GB | 1 580 928 | 12/1980 |
| WO | WO 99/05063 | 2/1999 |

OTHER PUBLICATIONS

M. Tatic and B. Drzaj, Studies In Surface Science and Catalysis, vol. 24, (Zeolites: Synthesis, Structure, Technology and Application), "A Contribution to the Synthesis of the Low–Silica X Zeolite" pp. 129–136, 1985.

Günter H. Kühl, "Crystallization of Low–Silica Faujasite ($SiO_2/Al_2O_3$~2.0)", Zeolites, 1987, vol. 7, Sep., pp. 451–457.

C. G. Coe, "Molecularly Engineered Adsorbents for Air Separation," Process Technology Proceedings, vol. 8, 1990, pp. 149–157.

D. W. Breck, W. G. Eversole, R. M. Milton, T. B. Reed and T. L. Thomas, "Crystalline Zeolites. I. The Properties of a New Synthetic Zeolite, Type A," Journal of the American Chemical Society, vol. 78, Dec. 8, 1956, No. 23, pp. 5963–5977.

* cited by examiner

Primary Examiner—David A. Simmons
Assistant Examiner—Frank M. Lawrence
(74) Attorney, Agent, or Firm—Philip H. Von Neida; Salvatore P. Pace

(57) ABSTRACT

Nitrogen oxides and low molecular weight hydrocarbons are removed from air by subjecting the air to a temperature swing adsorption process using as the adsorbent a composite zeolite product containing both zeolite type A and zeolite type X. The composite zeolite product is prepared by crystallizing a sodium ion- or sodium ion- and potassium ion-containing alumina-silica hydrogel under conditions which result in the production of a zeolitic composite which contains both zeolite type A and zeolite type X crystal domains. In a preferred embodiment, calcium ions constitute a substantial number of the composite's exchangeable cations and the type X portion of the composite zeolite product has a silicon-to-aluminum atomic ratio in the range of 0.9 to less than 1.15. The nitrogen oxide- and hydrocarbon-selective adsorbent can be incorporated into an atmospheric air prepurification plant downstream of a water vapor-selective adsorbent and a carbon dioxide-selective adsorbent.

36 Claims, No Drawings

TEMPERATURE SWING ADSORPTION PROCESS

FIELD OF THE INVENTION

This invention relates to the purification of gases, and more particularly to the decrease of impurity levels of nitrogen oxides and low molecular weight hydrocarbons in air. Specifically, the invention relates to the simultaneous removal of nitrous oxide and $C_2$–$C_5$ hydrocarbon gases from air by contacting the air with a zeolitic composite which, in its "as crystallized" form, contains both type A crystalline units and type X crystalline units.

BACKGROUND OF THE INVENTION

In cryogenic air separation units (ASUs), atmospheric air is liquefied at cryogenic temperatures and subsequently fractionally distilled into its major components, nitrogen, oxygen and argon. Since water vapor and carbon dioxide freeze at temperatures well above the temperature at which air is liquefied, these compounds must be removed from atmospheric air prior to its introduction to the ASUs to avoid clogging of ASU equipment lines by the accumulation of ice and frozen carbon dioxide in the heat exchange equipment used to chill the air to its liquefaction temperature. ASUs are commonly equipped with air prepurification units (PPUs) to remove water vapor and carbon dioxide from ASU feed air. In modem ASU plants, the PPUs contain one or more layers of adsorbent materials which selectively adsorb water vapor and/or carbon dioxide from air. Such PPUs are generally operated on either pressure swing adsorption (PSA) cycles or temperature swing adsorption (TSA) cycles. Adsorbents suitable for the removal of moisture from air include activated alumina, silica gel and sodium X zeolite, and those typically used for the removal of carbon dioxide from air include type X zeolites.

Atmospheric air also contains trace amounts of nitrogen oxides and low molecular weight hydrocarbons. Since the concentration of these impurities in atmospheric air is much lower than the concentrations of water vapor and carbon dioxide in the air, their presence in air was not considered to be a problem in cryogenic air separation operations. In recent years, however, the concentration of nitrogen oxides and gaseous hydrocarbons in atmospheric air has been steadily growing as the number and size of operating petroleum refineries and chemical process plants in the world increases. Furthermore, the increase in concentration of some of these impurities in air is accelerating because of their extremely long life in the atmosphere. The "lifetime" of nitrous oxide ($N_2O$), for example, in the atmosphere is as long as 150 years. Because of the increasing demand for higher purity air separation products, and to avoid the creation of explosion or fire hazards in ASUs, it is now often considered highly desirable or necessary to also remove nitrogen oxide and hydrocarbon impurities from the feed air to ASUs.

Unfortunately, the above-mentioned adsorbents have little or no selectivity for nitrogen oxides and hydrocarbons, particularly in the presence of moisture and carbon dioxide. Consequently, they do not effectively remove these impurities from air. Furthermore, although some adsorbents selectively remove certain low molecular weight hydrocarbons from air, while other adsorbents preferentially adsorb nitrogen oxides and certain other low molecular weight hydrocarbons from air, no single adsorbent material is known to effectively remove both nitrogen oxides and all common low molecular weight hydrocarbons from air. For example, type A zeolites, such as cation-exchanged zeolite A and particularly calcium zeolite A, selectively remove some hydrocarbons from air, but they do not preferentially adsorb nitrogen oxides, while, on the other hand, divalent cation-exchanged type X zeolites, such as calcium X zeolite, readily adsorb nitrogen oxides from air, but do not remove all hydrocarbons from air.

It can be appreciated from the above, that if it is desired to have an air purification system remove substantially all low molecular weight hydrocarbons and nitrogen oxides from atmospheric air using currently practiced adsorption technology, it will be necessary to include multiple adsorbent layers in the purification system. If it is also desired to remove water vapor and carbon dioxide from the air, it may be necessary to additionally include in the system a layer of adsorbent to remove water vapor, and one to remove carbon dioxide.

Crystallization techniques for making various type X and type A zeolites are described in the patent and technical literature. Typical of such procedures are those described in U.S. Pat. Nos. 2,882,243, 2,882,244, 4,173,622, 4,303,629, 4,443,422, east German Patent 43,221 and British Pat. No. 1,580,928, and in Tatic, M. et al., in "Zeolites: Synthesis, Structure, Technology and Application", *Studies in Surface Science and Catalysis*, vol. 24, pp. 129–136 (1985).

A procedure for producing alkali or alkaline earth cation-exchanged zeolite A-LSX for use as softeners in detergents is disclosed in U.S. Pat. No. 5,908,823.

Efforts to develop more efficient and less costly methods and equipment for removing all of the above-described impurities from atmospheric air prior to its introduction into an ASU are constantly sought. The present invention provides a method and PPU system which accomplish this goal.

SUMMARY OF THE INVENTION

According to a first broad embodiment, the invention comprises apparatus comprising:

(a) a vessel having a feed air inlet and a purified air outlet;

(b) a water vapor-selective adsorbent positioned within the vessel adjacent the air inlet; and (c) a composite zeolitic adsorbent selective for at least one nitrogen oxide and at least one low molecular weight hydrocarbon positioned within the vessel between the water vapor-selective adsorbent and the purified air outlet, the composite zeolitic adsorbent, as synthesized, comprising about 5 to about 95% by weight zeolite type A and about 95 to about 5% by weight zeolite type X, and wherein at least part of the exchangeable cations of said zeolite A and at least part of the exchangeable cations of said zeolite X are divalent cations.

In a preferred aspect of the apparatus embodiment of the invention, the composite zeolitic adsorbent is prepared by the process comprising the steps:

(1) forming a uniform aqueous silica- and alumina-containing reaction mixture comprising sodium ions or both sodium and potassium ions, the concentrations of the components in the reaction mixture being such that the $SiO_2/Al_2O_3$ molar ratio is in the range of about 1.3 to about 3.5; the $(Na_2O+K_2O)/SiO_2$ molar ratio is in the range of about 0.25 to about 5.0, the $K_2O/(Na_2O+K_2O)$ molar ratio is in the range of about 0 to about 0.35 and the $H_2O/(Na_2O+K_2O)$ molar ratio is greater than about 10;

(2) subjecting the reaction mixture to a crystallization procedure at least part of which includes maintaining the reaction mixture at a temperature in the range of about 60 to about 100° C., thereby producing a composite zeolitic product; and (3) at least partially exchanging the composite zeolitic product with divalent cations.

In another preferred aspect of the apparatus embodiment, about 50 to about 100% of the exchangeable cations of the zeolite type A and about 50 to about 100% of the exchangeable cations of the zeolite type X are calcium ions.

In another preferred aspect of the apparatus embodiment, at least 50% of the zeolite type X has a Si/Al atomic ratio in the range of about 0.9 to less than about 1.15. In a more preferred aspect, the zeolite type X has a Si/Al atomic ratio less than about 1.1.

In another preferred aspect of the apparatus embodiment, at least 90% of the exchangeable cations of the zeolite type A and at least 90% of the exchangeable cations of the zeolite type X are calcium ions.

In another preferred aspect of the apparatus embodiment, the water vapor-selective adsorbent comprises activated alumina, silica gel, zeolite sodium X or mixtures thereof.

In another preferred aspect, the apparatus further comprises a carbon dioxide-selective adsorbent positioned within the vessel between the water vapor-selective adsorbent and the composite zeolitic adsorbent. In this preferred aspect, the carbon dioxide-selective adsorbent preferably comprises zeolite type X.

In another preferred aspect of the apparatus embodiment, the concentrations of the components in the reaction mixture formed in step (1) are such that the $SiO_2/Al_2O_3$ molar ratio is in the range of about 1.8 to about 2.8; the $(Na_2O+K_2O)/SiO_2$ molar ratio is in the range of about 1.4 to about 3.8, the $K_2O/(Na_2O+K_2O)$ molar ratio is in the range of about 0 to about 0.25 and the $H_2O/(Na_2O+K_2O)$ molar ratio is greater than about 30.

In another preferred aspect of the apparatus embodiment, the reaction mixture is maintained at a temperature in the range of about 60 to about 90° C. during at least part of step (2) of the process of preparing the composite zeolitic adsorbent.

In another preferred aspect of the apparatus embodiment, the composite zeolitic product comprises about 20 to about 50% by weight zeolite type A and about 80 to about 50% by weight zeolite type X.

In another preferred aspect of the apparatus embodiment, the process of preparing the composite zeolitic adsorbent further comprises the step of drying the at least partially divalent cation-exchanged composite zeolitic product of step (3) at a temperature in the range of ambient temperature to about 150° C.

According to another broad embodiment, the invention comprises a method of purifying a gas comprising the step of removing at least one nitrogen oxide and at least one low molecular weight hydrocarbon from the gas by subjecting the gas to a cyclic adsorption procedure comprising an adsorption step and an adsorbent regeneration step using a composite zeolitic adsorbent which, as synthesized, comprises about 5 to about 95% by weight zeolite type A and about 95 to about 5% by weight zeolite type X, and wherein at least part of the exchangeable cations of said zeolite A and at least part of the exchangeable cations of said zeolite X are divalent cations.

In a preferred aspect of the gas purification embodiment of the invention, the composite zeolitic adsorbent is prepared by the process comprising the steps:

(a) forming a uniform aqueous silica- and alumina-containing reaction mixture comprising sodium ions, or both sodium and potassium ions, the concentrations of the components in the reaction mixture being such that the $SiO_2/Al_2O_3$ molar ratio is in the range of about 1.3 to about 3.5; the $(Na_2O+K_2O)/SiO_2$ molar ratio is in the range of about 0.25 to about 5.0, the $K_2O/(Na_2O+K_2O)$ molar ratio is in the range of about 0 to about 0.35 and the $H_2O/(Na_2O+K_2O)$ molar ratio is greater than about 10;

(b) subjecting the reaction mixture to a crystallization procedure at least part of which includes maintaining the reaction mixture at a temperature in the range of about 60 to about 100° C., thereby producing a composite zeolitic product; and (c) at least partially exchanging the composite zeolitic product with divalent cations.

In another preferred aspect of the gas purification embodiment, the gas being purified is air.

In another preferred aspect of the gas purification embodiment, the cyclic adsorption procedure is temperature swing adsorption.

In another preferred aspect of the gas purification embodiment, about 50 to about 100% of the exchangeable cations of the zeolite type A and about 50 to about 100% of the exchangeable cations of the zeolite type X are calcium ions.

In another preferred aspect of the gas purification embodiment, at least 50% of the zeolite type X has a Si/Al atomic ratio in the range of about 0.9 to less than about 1.15. In a more preferred aspect, the zeolite type X has a Si/Al atomic ratio less than about 1.1.

In another preferred aspect, the gas purification method further comprises, prior to removing the at least one nitrogen oxide and the at least one low molecular weight hydrocarbon from the gas, removing water vapor from the gas by passing the gas through a water vapor-selective adsorbent comprising activated alumina, silica gel, zeolite sodium X or mixtures thereof. In a more preferred aspect, the gas purification method further comprises, prior to removing the at least one nitrogen oxide and the at least one low molecular weight hydrocarbon from the gas but subsequently to removing water vapor from the gas, removing carbon dioxide from the gas by contacting the gas with an adsorbent comprising zeolite type X.

In another preferred aspect of the gas purification embodiment, the concentrations of the components in the reaction mixture formed in step (a) are such that the $SiO_2/Al_2O_3$ molar is in the range of about 1.8 to about 2.8; the $(Na_2O+K_2O)/SiO_2$ molar ratio is in the range of about 1.4 to about 3.8, the $K_2O/(Na_2O+K_2O)$ molar ratio is in the range of about 0 to about 0.25 and the $H_2O/(Na_2O+K_2O)$ molar ratio is greater than about 30.

In another preferred aspect of the gas purification embodiment, the reaction mixture is maintained at a temperature in the range of about 60 to about 90° C. during at least part of step (b) of the process of preparing the composite zeolitic adsorbent.

In another preferred aspect of the gas purification embodiment, the composite zeolitic product comprises about 20 to about 50% by weight zeolite type A and about 80 to about 50% by weight zeolite type X.

In another preferred aspect of the gas purification embodiment, the process of preparing the composite zeolitic adsorbent further comprises the step of drying the at least partially divalent cation-exchanged composite zeolitic product of step (c) at a temperature in the range of ambient temperature to about 150° C.

In another preferred aspect of the gas purification embodiment the at least one nitrogen oxide comprises nitrous oxide.

In another preferred aspect of the gas purification embodiment, the at least one low molecular weight hydrocarbon comprises $CH_4$, $C_2$ hydrocarbons, $C_3$ hydrocarbons, $C_4$ hydrocarbons, $C_5$ hydrocarbons, or mixtures thereof. In a more preferred aspect, the at least one low molecular weight hydrocarbon comprises ethane, ethylene, propane or mixtures thereof.

In another preferred embodiment, the adsorbent regeneration step of the gas purification method is carried out at a temperature in the range of about 150 to about 280° C.

In a preferred aspect of the apparatus and method embodiments, at least 80% by weight of the composite zeolitic product has a primary particle dimension in the range of about 0.2 to about 15 microns, and preferably has a primary particle dimension in the range of about 0.5 to about 5 microns.

In another preferred aspect of the apparatus and method embodiments, the process of preparing the composite zeolitic adsorbent further comprises agglomerating the at least partially divalent cation-exchanged composite zeolitic product with a binding agent. In a more preferred aspect, the process further comprises calcining the agglomerated particles at a temperature of about 400 to about 800° C., and preferably at a temperature of about 500 to about 700° C.

DETAILED DESCRIPTION OF THE INVENTION

The nitrogen oxide- and low molecular weight hydrocarbon-selective zeolite used in the air purification apparatus and process of the invention contains both zeolite type A crystal units and zeolite type X crystal units. The type A crystal units, particularly at least partially divalent-cation-exchanged type A zeolite crystal units, are effective for the adsorption of linear low molecular weight hydrocarbons, such as ethane, ethylene, propane, n-butane, etc. Divalent cation-exchanged type X zeolite units, particularly calcium-exchanged type X zeolite units, are highly effective for the adsorption of nitrogen oxides, particularly nitrous oxide, from gas streams. Divalent cation-exchanged type X zeolite units also preferentially adsorb larger sized low molecular weight hydrocarbons, such as straight-chain hydrocarbons, branched-chain hydrocarbons and aromatic hydrocarbons, from gas streams. For purposes of this invention, low molecular weight hydrocarbons are defined as having up to eight carbon atoms.

The type A/type X zeolites used in the invention can be substantially completely exchanged with divalent cations, or they can be partially cation exchanged, so that they contain not only the divalent cations, but also the cations originally on the zeolite, which are usually sodium ions or a combination of sodium and potassium ions. It is sometimes preferable to only partially exchange the base zeolite, so that its exchangeable cations will include sodium or both sodium and potassium type A and type X zeolite crystal units in addition to the divalent cation-exchanged type A and type X crystal units.

The type A and X crystal units are incorporated in the zeolite structure during crystallization of the hydrogel used as the reaction medium in the preparation of the zeolite composite. The method used to prepare and crystallize the hydrogel is not critical to the invention and, in general, can be any procedure which produces the desired zeolite crystalline structure. A suitable procedure for preparing the zeolite is described in detail in U.S. Pat. No. 5,908,823, the disclosure of which is incorporated herein by reference.

In general, the nitrogen oxide- and hydrocarbon-selective zeolite is prepared by directly synthesizing a mixed NaX/NaA or mixed Na,KX/Na,KA zeolite from an aqueous reaction mixture containing sources of alumina, silica and sodium ions or a mixture of sodium ions and potassium ions. The reaction mixture, which is usually in the form of a hydrogel, may be formed from a solution, suspension or emulsion of the reactants.

Preferred sources of alumina, silica and sodium ions or sodium and potassium ions are those that will not introduce undesired ions into the system. Suitable sources of silica include waterglasses, silica sols, aerosils (fumed silicas) silica gels, precipitated silicas, etc. Preferred silica sources include silica sols and the various silicates, such as sodium silicate and hydrated sodium metasilicate. Useful sources of alumina include hydrated aluminum hydroxide, pseudo-boehmite, alumina trihydrate, etc. Preferred alumina sources include sodium aluminate and hydrated aluminum hydroxide. Amorphous, partly crystalline or crystalline clays can also be used as sources of silica and alumina. Suitable clays include kaolins, such as raw kaolin, calcined kaolin, metakaolin, etc., and kandites, such as kaolinite, nacrite, dickite, halloysite, etc. Other sources of silica and alumina, for example, binary compositions such as silica-alumina, can also be used in the invention. Preferred sodium ion sources include sodium hydroxide, and preferred sodium and potassium ion sources include sodium hydroxide-potassium hydroxide mixtures.

The reaction mixture can be formed by any suitable method. A typical procedure comprises combining, at the desired temperature, aqueous systems, e. g., aqueous solutions or suspensions, of aluminate ions and silica in ratios that will produce a hydrogel. A preferred method of making the hydrogel mixture comprises separately forming sodium aluminate and sodium silicate aqueous solutions, preferably using deionized water. The reaction mixture is then maintained at a temperature that will produce the desired combined sodium A-sodium X zeolite product for a specified time period, after which the crystallized zeolite is separated from the reaction medium by any suitable technique, such as filtration.

The relative amounts of the components in the systems are such that the $SiO_2/Al_2O_3$ molar ratio in the reaction mixture will be in the range of about 1.3 to about 3.5, preferably will be in the range of about 1.8 to about 2.8 and most preferably will be in the range of about 2.0 to about 2.6; the $(Na_2O+K_2O)/SiO_2$ molar ratio will be in the range of about about 0.25 to about 5.0, preferably will be in the range of about 1.4 to about 3.8, and most preferably will be in the range of about 1.5 to about 3.6; the $K_2O/(Na_2O+K_2O)$ molar ratio will be in the range of about 0 to about 0.35 and preferably will be in the range of about 0 to about 0.25: and the $H_2O/(Na_2O+K_2O)$ molar ratio will be greater than 10, preferably will be greater than about 30 and most preferably will be at least about 40.

The reaction mixture is then subjected to crystallization in suitable containers, for example, mild steel or stainless steel tanks or polymer-lined vessels, at temperatures in the range of about 45 to about 100° C. However, at least part of the crystallization is carried out at temperatures in the range of about 60 to about 100° C., because such higher temperatures promote the formation of type A zeolite. Preferably at least partial crystallization of the reaction mixture is carried out at temperatures in the range of about 60 to about 90° C. The relative amounts of crystal units of type A and type X zeolites in the products used in the invention can be controlled by careful control of the crystallization conditions.

The crystallization step can be tailored to produce one or more of low silicon type X (LSX) zeolite, defined as type X zeolite having a Si/Al atomic ratio of 1.0 to about 1.1, medium silicon type X (MSX), defined as type X zeolite having a Si/Al atomic ratio in the range of >1.1 to about 1.2, and conventional to high silicon type X, defined as type X zeolite having a Si/Al atomic ratio in the range of >1.2 to about 1.5. Preferred zeolites of the type X crystalline portion of the composite product are LSX and MSX zeolites. In the most preferred embodiments, all or substantially all of the type X crystal units in the composite zeolite are LSX crystal units. Ideally, part of the crystallization is carried out at temperatures below 70° C., and preferably at temperatures in the range of about 50 to about 65° C., since a crystallization temperature in this range promotes direction of the crystallization toward formation of LSX.

A preferred method of making the sodium or mixed sodium-potassium exchanged zeolite composite comprises the following steps: First, an aqueous sodium aluminate or mixed sodium aluminate-potassium aluminate solution is prepared by uniformly dispersing sodium aluminate in deionized water and mixing the resulting suspension with a solution of sodium hydroxide or a solution of sodium hydroxide and potassium hydroxide. Secondly, an aqueous sodium silicate solution is diluted with deionized water. The sodium aluminate or sodium and potassium aluminate solution and the sodium silicate solution are then rapidly mixed with sufficient agitation to produce a uniform mixture. The mixing process is preferably carried out at a temperature in the range of about 5 to about 60° C., and it is more preferably carried out at a temperature in the range of about 20 to about 30° C. The mixing step is generally carried out for a period of up to about 1 hour, and results in the formation of a hydrogel. The hydrogel is stirred until homogeneous, e. g., 30 minutes, and it is then transferred into crystallization vessels, e. g., mild steel or stainless steel tanks or polymer-lined vessels. Crystallization is carried out at atmospheric pressure for a period of about 15 hours to about 10 days at a selected crystallization temperature in any crystallization vessel used in typical zeolite crystallization processes. The crystallization temperature is then adjusted, if necessary, to produce the desired structural mix of type A and type X zeolite powder. The reaction mixture may optionally be continuously or intermittently stirred. Finally, the solid zeolite powder product is separated from the mother liquor by, for example, filtration. The product is washed with water (preferably deionized water) or an aqueous solution of about 0.01 N sodium hydroxide solution, and, if necessary, dried at a temperature in the range of about ambient temperature to about 150° C.

The powder product, as synthesized, comprises a mix of crystallites, mostly intergrown, which are composed of zeolite A and zeolite X crystal units, and aggregates of the intergrown crystallites held together both by physical forces (adhesion) and/or chemical bonding between the crystallites in their boundary regions.

The composite zeolite powder generally has a primary particle dimension in the range of about 0.2 to about 15 microns and in preferred embodiments of the invention it has a primary particle dimension in the range of about 0.5 to about 5 microns. For purposes of this invention, "primary particle dimension" is defined as the diameter characteristic of the size of a sphere circumscribing the averaged-size particle of the as-synthesized powder product. If desired, the zeolites produced by the method of the invention can be made into pellets by, for example, compaction in a die (without a binder) followed by crushing and sieving to the desired size. When the zeolites of the invention are to be used in industrial adsorbers, it may be preferred to aggregate the zeolites with binders to control the column fluid dynamics and macropore diffusion within the aggregates. Those skilled in molecular sieve technology are aware of conventional techniques for aggregating molecular sieves. Such techniques usually involve mixing the molecular sieve with a binder and shaping the mixture into aggregate particles, by, for example, extrusion or bead formation. The resulting "green" shaped aggregate particles are dried and cured, i. e., calcined, to set the binder and harden the particles so that they are more crush-resistant. This is accomplished by heating the shaped particles to a temperature in the range of about 400 to about 800° C., and preferably to a temperature in the range of about 500 to about 800° C.

The binder used in the aggregation step can be any of the many binders that are available and that will not significantly interfere with the desired use of the zeolite as a gas adsorbent. Binders suitable for aggregating the zeolites include the various clays, silicas, aluminas, metal oxides and mixtures thereof, for example, binary compositions such as silica-alumina, silica-magnesia, silica-zirconia, silica-thoria, silica-beryllia, and silica-titania, and ternary compositions, such as silica-alumina-thoria, silica-alumina-zirconia. The particular binder used in the invention is not critical and any of the above or other binders can be used in the process of the invention. Clay is a preferred binder because of its low cost and ready availability. Other additives may be used to control the rheology of the mixture during the aggregation step and/or the porosity of the final activated product.

The relative proportions of zeolite and binder may vary over a wide range. In general, the aggregate generally comprises about 65 to about 99% zeolite and about 35 to about 1% binder, and it preferably comprises about 80 to about 96% zeolite and about 20 to about 4% by weight binder (weight % on a dry basis).

The composite zeolite powder produced by the above-described steps is divalent cation exchanged. The ion-exchange step can be carried out before or after agglomeration of the zeolite powder by any of the well-known procedures. A typical procedure comprises contacting the zeolite powder (before or after drying) or the calcined aggregate particles with an aqueous base or salt solution of the desired ions at a temperature in the range of, for example, about ambient to about 100° C. This results in the replacement of at least part of the sodium or sodium and potassium ions initially on the zeolite with the selected divalent exchange ion or ions. In a preferred embodiment, the divalent cation exchange is performed on the zeolite filter cake. The divalent cation or cations which can be ion-exchanged include, among others, calcium, magnesium, strontium, barium, zinc, copper, cadmium, cobalt, manganese, iron, nickel and mixtures of these. Preferred divalent cations are those of Group 2a of the periodic table, particularly calcium, magnesium and strontium, and mixtures of these. The most preferred divalent cation is calcium. Suitable divalent cation bases include as $Ca(OH)_2$, $Mg(OH)_2$, etc., and suitable salts include chlorides, nitrates, sulfates, etc. The most preferred salts are the chlorides, such as $CaCl_2$, $MgCl_2$, etc. Preferred divalent cation bases include $CaCl_2$ and $Ca(OH)_2$. The ion-exchanged particles can be activated by heating them to a temperature of about 400 to about 800° C., but preferably to a temperature in the range of 450 to 600° C.

The nitrogen-oxide- and low molecular weight hydrocarbon-selective zeolites can be used in various industrial applications, such as adsorptive gas purification or gas separation. An adsorption application to which the products of the invention are well adapted is the prepurification of air by temperature swing adsorption (TSA) or pressure swing adsorption (PSA) prior to introducing the air into an air separation unit such as a cryogenic distillation column. The zeolites of the invention are particularly suitable for such processes because of their high adsorption capacity. They are especially suitable for TSA processes because of their specific adsorption properties and superior thermal stability.

In air PPU systems, the nitrogen oxide- and hydrocarbon-selective zeolite can be used in a single layer adsorption process or it can be used in combination with other adsorbents. In a preferred application, the zeolite is used as a downstream layer, for example, downstream of a water-selective layer, such as activated alumina, silica gel, etc., and a carbon dioxide-selective layer, such as zeolite NaX, NaLSX, etc. Since water vapor is more strongly adsorbed by most common adsorbents, it is desirable to position the water-selective layer at the air feed inlet end of the PPU. Similarly, carbon dioxide is strongly adsorbed by many adsorbents; accordingly, it is preferable to position the carbon dioxide-selective layer upstream of the nitrogen oxide- and hydrocarbon-selective zeolite, most preferably between the water selective layer and the nitrogen oxide- and hydrocarbon-selective zeolite layer.

PSA and TSA processes are generally cyclic and comprise at least an adsorption step and an adsorbent regeneration step. In TSA processes, the adsorption step is generally carried out at a temperature in the range of about 5 to about 50° C., and the adsorbent regeneration step is generally carried out at a temperature in the range of about 100 to about 250° C.

It will be appreciated that it is within the scope of the present invention to utilize conventional equipment to monitor and automatically regulate the composite zeolitic adsorbent synthesis and the adsorption process so that they can be fully automated to run continuously in an efficient manner.

The invention is further illustrated by the following examples, in which, unless otherwise indicated, parts, percentages and ratios are on a mole basis.

The zeolite powder samples made in the examples were characterized by X-ray powder diffraction (XRD) on a Philips APD 3600/2 diffractometer for crystallinity and phase identification. Scanning Electron Microscopy (SEM) on a Hitachi S-520 Microscope was used to determine the morphology and crystal size of the samples. Inductively Coupled Plasma Emission Spectrometry (ICP) using an ARL-3510 Sequential ICP Spectrometer was used for the determination of the bulk chemical composition.

EXAMPLES 1–17

The raw materials used in the following examples were, on a weight percentage basis: sodium aluminate, (57% $Al_2O_3$ and 40.2% $Na_2O$); sodium silicate, (29.8% $SiO_2$ and 8.8% $Na_2O$); sodium hydroxide; and deionized water. In each example, the sodium hydroxide was fully dissolved in deionized water, and sodium aluminate was added to the resulting solution. Sodium silicate was separately mixed with deionized water, and the mixture added rapidly to the sodium aluminate solution, thereby causing the formation of a hydrogel. The mole ratios of the hydrogel composition are shown in Table 1. The hydrogel of each sample was stirred for about 30 minutes to produce a homogeneous mixture, and the mixture was then transferred into 150 ml polypropylene bottles, and the bottles were sealed. The sealed bottles were placed in a convection oven, and hydrothermal crystallization of each sample was carried out statically at autogeneous pressure and at the reaction temperature specified in Table 1. Samples were periodically withdrawn during the course of crystallization. After completion of the crystallization, the white solid product was recovered by vacuum filtration, washed with aqueous 0.01N NaOH solution and dried overnight at ambient temperature. The samples were then rehydrated to their equilibrium water capacity by storing them over a saturated aqueous sodium chloride solution. Crystallization conditions, product identity, as determined by XRD, and the bulk chemical composition of the products are summarized in Table 1. The XRD patterns of the products made in all these examples are consistent with that of a composite material constituted by both zeolite X and zeolite A structural units. Scanning electron microscopy of this material revealed primary structure particle morphology typical of intergrown particles, rather than morphology typical of pure zeolite A or zeolite X type crystals. The Si/Al atomic ratios of these zeolite composite products were between 1.04 and 1.12.

TABLE 1

| Example No. | Gel Composition | | | Crystallization Time, hr:min | | Crystallinity % | | Si/Al | Na/Al |
|---|---|---|---|---|---|---|---|---|---|
| | $SiO_2/Al_2O_3$ | $OH/SiO_2$ | $H_2O/Na_2O$ | at 60° C. | at 100° C. | NaA | NaLSX | | |
| 1 | 2.25 | 3.69 | 70.1 | 78:24 | | 13 | 88 | 1.06 | 0.99 |
| 2 | " | " | " | 94:21 | | 12 | 90 | 1.08 | 1.02 |
| 3 | " | " | " | 102:18 | | 13 | 90 | 1.07 | 1.01 |
| 4 | " | 3.60 | 75.0 | 75:31 | | 13 | 62 | 1.08 | 0.98 |
| 5 | " | " | " | 90:15 | | 16 | 86 | 1.05 | 0.98 |
| 6 | " | " | " | 98:25 | | 16 | 86 | 1.05 | 0.98 |
| 7 | 2.30 | 3.70 | 65.0 | 45:11 | | 55 | 49 | 1.04 | 1.00 |
| 8 | " | " | " | 53:00 | | 56 | 49 | 1.06 | 1.02 |
| 9 | " | " | " | 69:19 | | 53 | 52 | 1.06 | 1.01 |
| 10 | 2.50 | 3.50 | 70.0 | 24:15 | 4:00 | 48 | 51 | 1.12 | 1.04 |
| 11 | " | " | " | 24:15 | 7:00 | 49 | 52 | 1.11 | 1.03 |
| 12 | " | " | " | 24:15 | 24:00 | 47 | 57 | 1.12 | 1.03 |
| 13 | 2.35 | 3.50 | " | 24:00 | | 24 | 74 | 1.07 | 1.02 |
| 14 | " | " | " | 30:00 | | 23 | 74 | 1.05 | 1.01 |
| 15 | " | " | " | 24:00 | 2:00 | 24 | 75 | 1.06 | 1.03 |
| 16 | " | " | " | 24:00 | 6:00 | 21 | 78 | 1.06 | 1.01 |
| 17 | " | " | " | 24:00 | 70:10 | 10 | 89 | 1.03 | 1.01 |

EXAMPLE 18

To 94.5 g of technical grade sodium silicate (26.9% $SiO_2$ and 8.6% was added 432 ml of distilled water. Under stirring, 58 g of technical grade 50% sodium hydroxide solution was added to the sodium solution, and the resulting mixture was stirred at ambient temperature for one hour. Then, 90 g of technical grade sodium aluminate solution (1 9.2% $Al_2O_3$ and 18.9% $Na_2O$) was added slowly (within 3–5 minutes) under intense stirring. The composition of this reaction mixture corresponds to $4.5.Na_2O.Al_2O_3.2.5\ SiO_2.191.8\ H_2O$. The resulting reaction gel was stirred for another 15 minutes and then introduced into a 1000 ml glass vessel equipped with a metal lid. The lid had a small opening to avoid both significant loss of water and over-pressurization during crystallization. The gel was aged at ambient temperature for 3 hours without stirring, then placed in a water bath and heated for 45 minutes to a crystallization temperature of 76° C. After 18 hours of crystallization, the process was complete. The solid product was recovered by filtration, washed with three 250 ml portions of distilled water, and dried at approx. 60° C. XRD analysis showed that the recovered powder was composed of about 30% zeolite A type crystal units and about 70% zeolite X type crystal units (compared with reference samples of the pure zeolites). Scanning electron microscopy of this composite material provided evidence that there were no crystals of a morphology typical of pure cubic zeolite A. The product had a primary particle size between 2 and 5 $\mu$m and a Si/Al ratio of 1.12.

EXAMPLE 19

The product of Example 18 was further characterized with regard to its high crystallinity by adsorption measurements using a Micromeritics' Gemini 2370 adsorption device. The equilibrium water adsorption capacity of the composite powder product at 55% relative humidity and 25° C. was determined to be 28.2 wt. %. The micropore volume, measured by means of the Gemini 2370 device (nitrogen at 77 K) and evaluated using the t-plot method, amounted to 0.209 cc/g of activated material. The carbon dioxide adsorption, determined volumetrically at 25° C. using the same device, was 36 cc/g (STP) at 1.8 mm and 78 cc/g (STP) at 34 mm Hg carbon dioxide pressure.

EXAMPLE 20

Fifteen g of composite filter cake (water content approx. 35 wt. %) obtained from the product of Example 18 was suspended in 200 ml of distilled water. The suspension was stirred for 15 minutes, and then 29 g of $CaCl_2.H_2O$ was added thereto. The resulting mixture was heated under stirring to 60° C. and further stirred at this temperature for 6 hours. The resulting hot suspension was rapidly filtered, and the filter cake was washed with three 100 ml portions of distilled water. The washed filter cake was suspended in 200 ml of distilled water. The suspension was stirred for 1 5 minutes, after which another 29 g of $CaCl_2.H_2O$ was added thereto. The resulting mixture was then heated under stirring to 60° C. and maintained at this temperature under stirring for another 6 hours. The resulting hot suspension was rapidly filtered, and the double-exchanged filter cake washed with three 100 ml portions and slightly dried at 60° C. Analysis of the dried material showed an ion exchange of calcium versus sodium of about 96%.

EXAMPLE 21

To 240 g of technical grade sodium silicate (27,6% $SiO_2$ and 8.5% $Na_2O$) was added 420 ml of distilled water. Under stirring, 132 g of technical grade 50% sodium hydroxide solution and 124 g of 45% potassium hydroxide solution were added and the resulting mixture was stirred at ambient temperature for about 5 minutes. Then, 257 g of technical grade sodium aluminate solution (19.5% $Al_2O_3$ and 19.5% $Na_2O$) was added slowly (within 3–5 minutes) under intense stirring. The composition of this reaction mixture corresponds to $1.0.K_2O.\ 4.0.Na_2O.Al_2O_3.2.25\ SiO_2.100.H_2O$. The resulting reaction gel was stirred for another 15 minutes and then introduced into a 1000 ml glass vessel equipped with a metal lid having a small opening. The gel was aged at 35° C. for 3 hours without stirring, then placed into a water bath and heated during 45 minutes to a crystallization temperature of 60° C. After 20 hours of crystallization, the process was complete. The solid product was recovered by filtration, washed with three 250 ml portions of distilled water, and dried at about 60° C. XRD analysis showed that the recovered powder was composed by ca. 25% of zeolite A type crystal units and ca. 74% of zeolite X type crystal units (compared with reference samples of the pure zeolites). The equilibrium water adsorption capacity of the composite powder product at 55% relative humidity and 25° C. was determined to be 27.5 wt. %. The Si/Al ratio for this composite zeolite powder is 1.03.

EXAMPLE 22 (HYPOTHETICAL)

In this example, testing of the process of the invention on a typical scale TSA PPU unit, using composite zeolitic adsorbent made by the process of Example 20, is projected. The hydrocarbons assumed to be in the test air feed stream at the indicated concentrations are set forth in Table 2. These hydrocarbons are selected based on the results of a series of air quality surveys. The concentrations of the hydrocarbons were set based on the maximum observed values in the air quality surveys. The lower detection limits of all the above compounds were established by FTIR analysis. The adsorption temperature, feed gas pressure and superficial velocity are assumed to be 15° C., 85.6 psia, and 0.59 ft/sec, respectively. The projected results of this TSA PPU test experiment are reported in Table 2. In all cases the $CO_2$ concentration in the TSA PPU product is assumed to be about 1 ppm.

TABLE 2

| | | % Removal | | |
|---|---|---|---|---|
| Feed Impurity (Conc., ppm) | Detection Limit (ppm) | UOP NaX | BOC NaLSX | Present Invention Composite Zeolite |
| Water (saturated) | 1 | 100 | 100 | 100 |
| $CO_2$ (400) | 0.001 | 100 | 100 | 100 |
| $N_2O$ (0.3–0.35) | 0.005 | 35 | 45 | 100 |
| $C_2H_2$ (0.4–0.48) | 0.007 | 100 | 100 | 100 |
| $C_2H_4$ (1.4–1.6) | 0.01 | 35 | 40 | 100 |
| $C_2H_6$ (1.4) | 0.01 | 10 | 10 | 98 |
| $C_3H_6$ (0.55–0.75) | 0.01 | 100 | 100 | 100 |
| $C_3H_8$ (1.5–1.6) | 0.05 | 40 | 35 | 100 |
| n-$C_4H_{10}$ (1.6–1.8) | 0.02 | 100 | 100 | 100 |

The commercial adsorbent product, UOP NaX zeolite (grade APG II), and NaLSX are projected to fully remove $C_2H_2$, $CO_2$, $C_3H_6$, n-$C_4H_{10}$ and $H_2O$ from the gas stream. These adsorbents, however, are projected to only partially remove $N_2O$, $C_2H_4$, $C_2H_6$, and $C_3H_8$ from the gas stream. Table 2 also shows that it is projected that the composite zeolite of the invention will remove substantially all of the trace impurities in the gas stream, including $N_2O$ and all hydrocarbons present.

Although the invention has been described with particular reference to specific equipment arrangements and to a specific experiment, these features are merely exemplary of the invention and variations are contemplated. The scope of the invention is limited only by the breadth of the appended claims.

What is claimed is:

1. Apparatus comprising:
   (a) a vessel having a feed air inlet and a purified air outlet;
   (b) a water vapor-selective adsorbent positioned within the vessel adjacent said air inlet;
   (c) a composite zeolitic adsorbent selective for at least one nitrogen oxide and at least one low molecular weight hydrocarbon positioned within the vessel between said water vapor-selective adsorbent and said purified air outlet, said composite zeolitic adsorbent, as synthesized, comprising about 5 to about 95% by weight zeolite type A and about 95 to about 5% by weight zeolite type X, and wherein at least part of the exchangeable cations of said zeolite A and at least part of the exchangeable cations of said zeolite X are divalent cations; and is prepared by the process comprising the steps:
      (1) forming a uniform aqueous silica- and alumina-containing reaction mixture comprising sodium ions or both sodium and potassium ions, the concentrations of the components in said reaction mixture being such that the $SiO_2/Al_2O_3$ molar ratio is in the range of about 1.3 to about 3.5; the $(Na_2O+K_2O)/SiO_2$ molar ratio is in the range of about 0.25 to about 5.0, the $K_2O/(Na_2O+K_2O)$ molar ratio is in the range of about 0 to about 0.35 and the $H_2O/(Na_2O+K_2O)$ molar ratio is greater than about 10;
      (2) subjecting said reaction mixture to a crystallization procedure at least part of which includes maintaining said reaction mixture at a temperature in the range of about 60 to about 100° C., thereby producing a composite zeolitic product; and
      (3) at least partially exchanging said composite zeolitic product with divalent cations.

2. The apparatus of claim 1, wherein about 50 to about 100% of the exchangeable cations of said zeolite type A and about 50 to about 100% of the exchangeable cations of said zeolite type X are calcium ions.

3. The apparatus of claim 2, wherein at least 50% of said zeolite type X has a Si/Al atomic ratio in the range of about 0.9 to less than about 1.15.

4. The apparatus of claim 3, wherein said water vapor-selective adsorbent comprises activated alumina, silica gel, zeolite sodium X or mixtures thereof.

5. The apparatus of claim 1, further comprising a carbon dioxide-selective adsorbent positioned within the vessel between said water vapor-selective adsorbent and said composite zeolitic adsorbent.

6. The apparatus of claim 5, wherein said carbon dioxide-selective adsorbent comprises zeolite type X.

7. The apparatus of claim 3, wherein said zeolite type X has a Si/Al atomic ratio less than about 1.1.

8. The apparatus of claim 7, wherein at least 90% of the exchangeable cations of said zeolite type A and at least 90% of the exchangeable cations of said zeolite type X are calcium ions.

9. The apparatus of claim 1, wherein the concentrations of the components in the reaction mixture formed in step (1) are such that said $SiO_2/Al_2O_3$ molar ratio is in the range of about 1.8 to about 2.8; said $(Na_2O+K_2O)/SiO_2$ molar ratio is in the range of about 1.4 to about 3.8, said $K_2O/(Na_2O+K_2O)$ molar ratio is in the range of about 0 to about 0.25 and said $H_2O/(Na_2O+K_2O)$ molar ratio is greater than about 30.

10. The apparatus of claim 9, wherein said reaction mixture is maintained at a temperature in the range of about 60 to about 90° C. during at least part of step (2) of said process.

11. The apparatus of claim 2, wherein said composite zeolitic adsorbent comprises about 20 to about 50% by weight zeolite type A and about 80 to about 50% by weight zeolite type X.

12. The apparatus of claim 1, wherein said process further comprises the step of drying the at least partially divalent cation-exchanged composite zeolitic product at a temperature in the range of ambient temperature to about 150° C.

13. The apparatus of claim 1, wherein at least 80% by weight of said composite zeolitic product has a primary particle dimension in the range of about 0.2 to about 15 microns.

14. The apparatus of claim 7, wherein at least 80% by weight of said composite zeolitic adsorbent has a primary particle dimension in the range of about 0.5 to about 5 microns.

15. The apparatus of claim 1, wherein said process further comprises agglomerating the at least partially divalent cation-exchanged composite zeolitic product with a binding agent.

16. The apparatus of claim 15, wherein said process further comprises calcining the agglomerated product at a temperature of about 400 to about 800° C.

17. A method of purifying a gas comprising the step of removing at least one nitrogen oxide and at least one low molecular weight hydrocarbon from said gas by subjecting said gas to a cyclic adsorption procedure comprising an adsorption step and an adsorbent regeneration step using a composite zeolitic adsorbent which, as synthesized, comprises about 5 to about 95% by weight zeolite type A and about 95 to about 5% by weight zeolite type X, and wherein at least part of the exchangeable cations of said zeolite A and at least part of the exchangeable cations of said zeolite X are divalent cations; and is prepared by the process comprising the steps:
   (a) forming a uniform aqueous silica- and alumina-containing reaction mixture comprising sodium ions or both sodium and potassium ions, the concentrations of the components in said reaction mixture being such that the $SiO_2/Al_2O_3$ molar ratio is in the range of about 1.3 to about 3.5; the $(Na_2O+K_2O)/SiO_2$ molar ratio is in the range of about 0.25 to about 5.0, the $K_2O/(Na_2O+K_2O)$ molar ratio is in the range of about 0 to about 0.35 and the $H_2O/(Na_2O+K_2O)$ molar ratio is greater than about 10;
   (b) subjecting said reaction mixture to a crystallization procedure at least part of which includes maintaining said reaction mixture at a temperature in the range of about 60 to about 100° C., thereby producing a composite zeolitic product; and
   (c) at least partially exchanging said composite zeolitic product with divalent cations.

18. The method of claim 17, wherein said gas is air.

19. The method of claim 18, wherein said cyclic adsorption procedure is temperature swing adsorption.

20. The method of claim 17, wherein about 50 to about 100% of the exchangeable cations of said zeolite type A and about 50 to about 100% of the exchangeable cations of said zeolite type X are calcium ions.

21. The method of claim 18, wherein at least 50% of said zeolite type X has a Si/Al atomic ratio in the range of about 0.9 to less than about 1.1 5.

22. The method of claim 18, wherein said zeolite type X has a Si/Al atomic ratio less than about 1.1.

23. The method of claim 18, further comprising, prior to removing said at least one nitrogen oxide and said at least one low molecular weight hydrocarbon from said air, removing water vapor from said air by passing said air through a water vapor-selective adsorbent comprising activated alumina, silica gel, zeolite sodium X or mixtures thereof.

24. The method of claim 23, further comprising, prior to removing said at least one nitrogen oxide and said at least one low molecular weight hydrocarbon from said air but subsequently to removing water vapor from said air, removing carbon dioxide from said air by contracting said air with an adsorbent comprising zeolite type X.

25. The method of claim 18, wherein the concentrations of the components in said reaction mixture are such that said $SiO_2/Al_2O_3$ molar ratio is in the range of about 1.8 to about 2.8; said $(Na_2O+K_2O)/SiO_2$ molar ratio is in the range of about 1.4 to about 3.8, said $K_2O/(Na_2O+K_2O)$ molar ratio is in the range of about 0 to about 0.25 and said $H_2O/(Na_2O+K_2O)$ molar ratio is greater than about 30.

26. The method of claim 25, wherein said reaction mixture is maintained at a temperature in the range of about 60 to about 90° C. during at least part of step (b) of said process.

27. The method of claim 20, wherein said composite zeolitic adsorbent comprises about 20 to about 50% by weight zeolite type A and about 80 to about 50% by weight zeolite type X.

28. The method of claim 18, wherein said process further comprises the step of drying the at least partially divalent cation-exchanged composite zeolitic product at a temperature in the range of ambient temperature to about 150° C.

29. The method of claim 17, wherein said at least one low molecular weight hydrocarbon comprises $CH_4$, $C_2$ hydrocarbons, $C_3$ hydrocarbons, $C_4$ hydrocarbons, $C_5$ hydrocarbons, or mixtures thereof.

30. The method of claim 29, wherein said at least one nitrogen oxide comprises nitrous oxide.

31. The method of claim 30, wherein said at least one low molecular weight hydrocarbon comprises ethane, ethylene, propane or mixtures thereof.

32. The method of claim 17, wherein said adsorbent regeneration step is carried out at a temperature in the range of about 150 to about 280° C.

33. The method of claim 17, wherein at least 80% by weight of said composite zeolitic adsorbent has a primary particle dimension in the range of about 0.2 to about 15 microns.

34. The method of claim 17, wherein at least 80% by weight of said composite zeolitic adsorbent has a primary particle dimension in the range of about 0.5 to about 5 microns.

35. The method of claim 18, wherein said process further comprises agglomerating the at least partially divalent cation-exchanged composite zeolitic product with a binding agent.

36. The method of claim 35, wherein said process further comprises calcining the agglomerated product at a temperature of about 400 to about 800° C.

* * * * *